Feb. 17, 1959            A. O. WILSON            2,873,653

METHOD AND MEANS OF SECURING MACHINE WORK AGAINST A MACHINE TABLE

Filed Nov. 13, 1956                                            2 Sheets-Sheet 1

ARTHUR O. WILSON
*INVENTOR.*

BY
*Smith & Tuck*

Feb. 17, 1959     A. O. WILSON     2,873,653
METHOD AND MEANS OF SECURING MACHINE WORK AGAINST A MACHINE TABLE
Filed Nov. 13, 1956     2 Sheets-Sheet 2
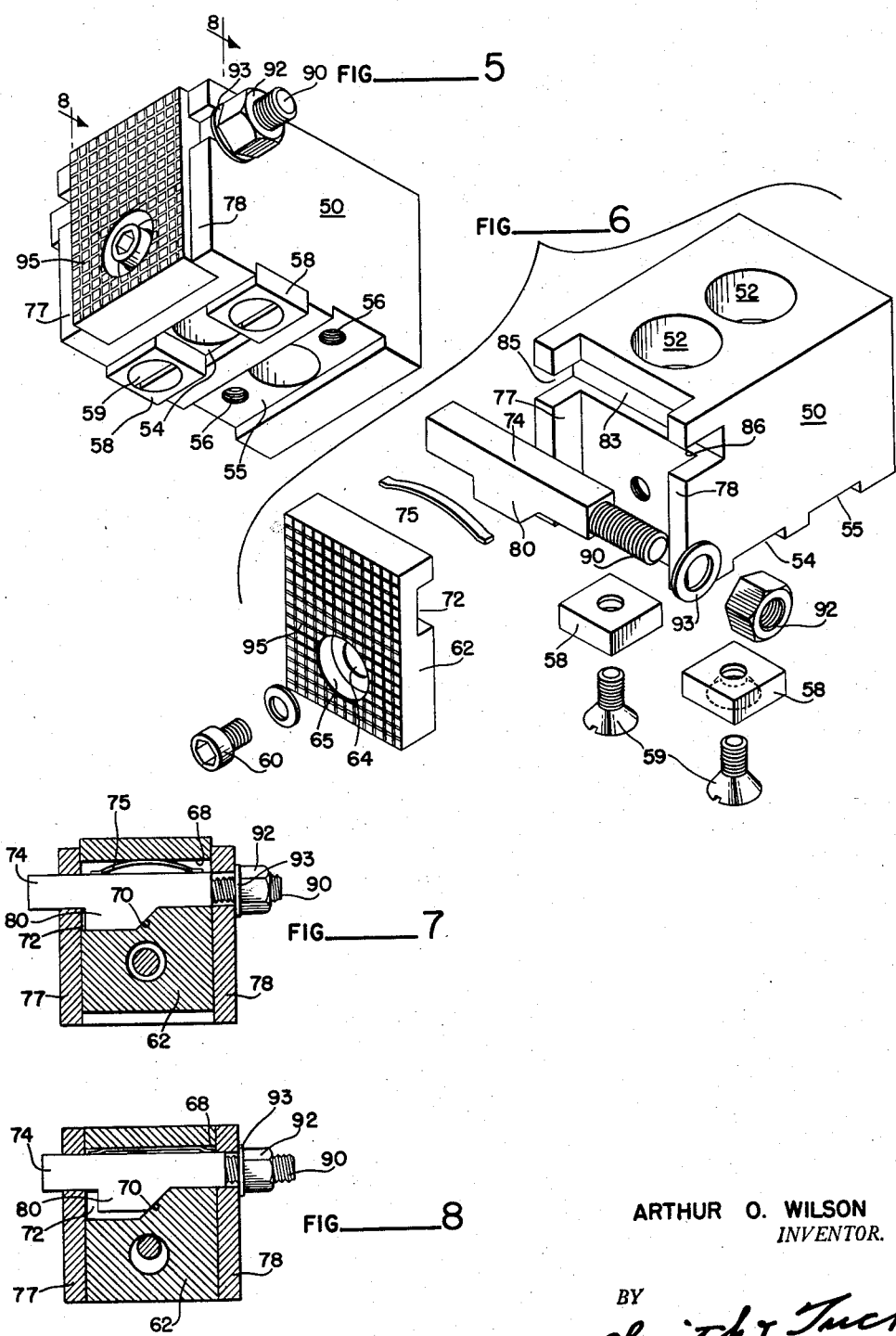
ARTHUR O. WILSON
*INVENTOR.*
BY
*Smith & Tuck*

United States Patent Office 2,873,653
Patented Feb. 17, 1959

2,873,653

METHOD AND MEANS OF SECURING MACHINE WORK AGAINST A MACHINE TABLE

Arthur O. Wilson, Seattle, Wash., assignor of one-half to Jim V. Karras, Seattle, Wash.

Application November 13, 1956, Serial No. 621,863

1 Claim. (Cl. 90—59)

My present invention relates to the general art of machine tool operation, and more particularly to gripping and holding-down means for association with machine operations, wherein parts to be machined are held against a grooved surface and it is essential that they are in snug engagement with the table, chuck or base plate surface. In carrying out my method of holding work to a machine table, I employ one set of clamp members capable of moving its jaws downwardly toward the machine table, but maintaining the machining line accurately, and which, when positioned in a groove of a machine table or the like, will establish a true line, which line will be parallel, or tangent, to the grooves in the table. In association with the elements which establish a line for the machine operations, I employ a second group of clamp members capable of two actions: one, that of pressing the work to the table; and, secondly, that of clamping the work between itself and abutting or coacting clamp members.

There are many machine operations where it is very necessary that metal members be machined to a definite over-all height or thickness, and in order to achieve this it is essential that the work, once one side has been machined, will lie with the machined side in firm engagement with the machine table surface throughout the entire machining operation, in order that accurate thickness or depth dimensions can be achieved.

In the past a large number of different types of clamps and hold-down means have been provided, with the aim of serving this purpose and thereby making it possible to obtain accurate dimensions, even though heavy cuts are taken from the metal surface exposed to the cutting. Such operations are very desirable in milling machine, planer and shaper operations, and in certain of the surfacing machine tools, such as boring mills, large lathes, grinders and the like, wherein work is secured to a base plate or a large chuck. It is very desirable that none of the clamping means extend up above the working surface. Any clamping means using vertically disposed bolts are very objectionable, in that they interfere with the cutting tools and usually require that they be removed one or two at a time; and then, after the cutting line has passed the bolt holes or clamp abutments, the bolts must be replaced. My present clamp means eliminates this time-wasting procedure.

In using my present method, I first put in place a plurality of first type clamp members having the parallel moving type of jaw. These clamps will establish the line of machining which may be straight, as on milling machines, shapers and planers, or it may be that the blocks will be placed in circular grooves, and then of course they would be merely tangent to the machining line or travel of the tool. The work is brought up to these clamps with the jaw member in the raised position. The second type of clamp members, which are capable of both vertical and horizontal movement, is then put in place in adequate number and engaged with the work. The second clamps are adjusted so as to be in firm engagement with the work and pressing the work firmly against the first group of clamps. Continued adjustment of the two-way clamps makes the engagement of the work more secure and, due to the camming action of the two-way clamps, the edge abutted by these clamps will be pressed firmly against the machine table. Before final adjustment has been completed on these clamps, it is normally desirable to adjust the vertically moving faces of the first type of alignment clamps by forcing them downwardly and thus carrying with them the workpiece, until it also is in firm engagement with the machine table. A final tightening can then be effected by the final adjustment of the second type or two-way clamps. Experience has shown that work held in this manner can take heavy thrusts, as from heavy cuts being made, without being moved or momentarily sprung out of position. This is a vast improvement over any form of bolting the casting or workpiece to the machine table, as in all those forms there has always been an opportunity for a certain amount of bending or elongation in the relatively long bolts that are normally used.

The principal object of my present invention, therefore, is to provide a method and means which will insure the quick placement and secure holding of workpieces on a machine tool table.

A further object of this invention is to provide such clamps, one type of which will establish the line of movement of the cutting tool, and the second group, aligned to coact with the fixed clamps, make it possible to securely anchor the workpiece to the machine table.

A further object of my invention is the provision of clamping means that will effect an appreciable saving in time on the part of the machine tool operator, and at the same time insure greater accuracy in the work as finally completed.

A further object of this invention is to provide a means of holding work firmly on the table of the machine, and at the same time leave the entire upper surface of the workpiece extending above, so as to allow the full surface to be machined without shifting or changing clamps.

Further objects, advantages and capabilities will be apparent from the description and disclosure in the drawings, or may be comprehended or are inherent in the device.

In the drawings:

Figure 5 is a perspective view illustrating an alignment form or first type of clamp employed opposite the clamps shown in Figure 1 and which clamps are capable of vertical movement only.

Figure 6 is an exploded view of the clamp illustrated in Figure 5.

Figures 7 and 8 show sequential movements of certain parts of my clamp blocks as they are employed in forcing work down into close engagement with a machine table suface.

Figure 1:
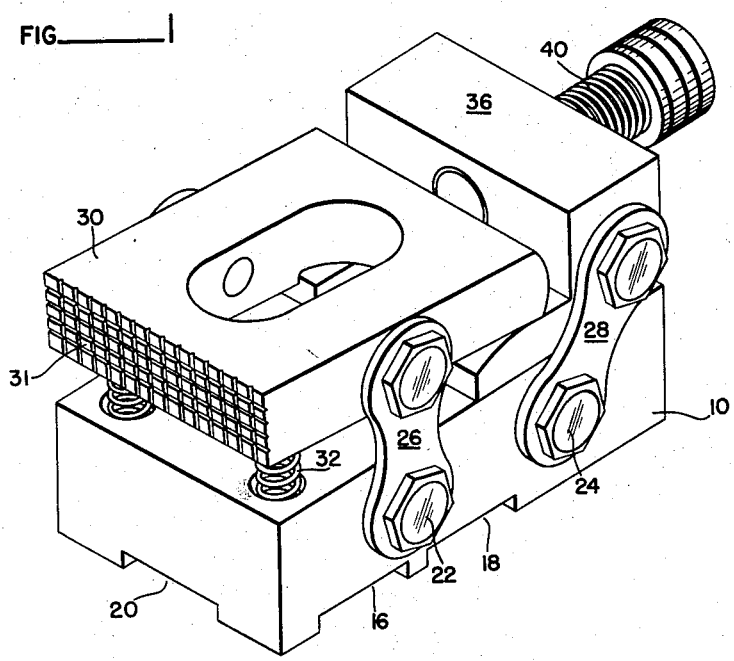
Figure 1 is a perspective view illustrating a preferred form of dual movement or second type clamps used in my method for securing machine work against a machine table.

Referring more particularly to the disclosure in the drawings, the numeral 10 indicates the base member of my dual movement or second type clamp units. This base member is provided with a plurality of slot-like openings as 12 and 14 adapted to receive the heads or the nut ends of hold-down bolts, depending somewhat on the equipment with which the clamp members are used. Guideways are provided, as 16 and 18, running transversely of the blocks, and another guideway as 20 running longitudinally of the block 10. These guideways provide means for gripping or aligning themselves with the grooved surfaces of machine tool work tables. Pivotally secured to block 10, as at 22 and 24, are coacting opposed pairs of links as 26 and 28. Link members 26 are pivotally secured to the movable clamp block 30, for which they provide positioning means. Block 30 has its outer end urged upwardly by the compression springs 32, which are recessed in block 10 in order to position them for use. The opposite end of clamp block 30 is curved so as to give a vertical elevational view after the showing of Figure 2, as indicated at 34.

The opposed links 28 are pivotally secured to a movable cam block 36, which rests normally on the upper surface of base 10 and is provided with a curved lower surface as 38, so that the cam block may rock on this surface at certain stages of the clamping operation. Links 28 form the sole positioning means for the cam block 36. Adapted to engage through threads in block 36 is the clamp screw 40. This screw is preferably provided with a hexagonal socket at 42, so that it may be tightened to considerable pressure by a suitable Allen type wrench. Screw 40 passes through to engage the curved portion 34 of the cam block 36.

Figure 2:
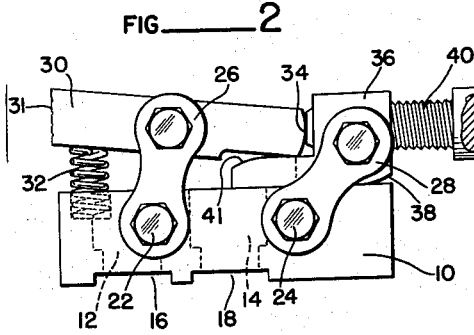
Figures 2, 3 and 4 are side elevations of the clamp of Figure 1, but showing the same in sequential operation, as being positioned in holding down work.
Figure 3:
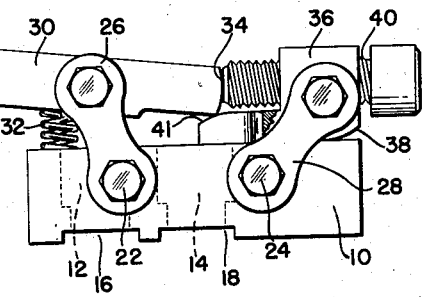
Figure 4:
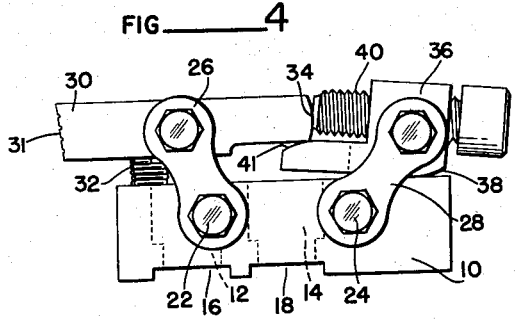

The sequence of operations is illustrated in Figures 2, 3 and 4, in which Figure 2 shows the engaging position in which face 31 of block 30 engages the work, and for this purpose is provided with a grilled or otherwise roughened surface, as will be noted in Figure 1. In this position, with screw 40 backed off, springs 32 force end 31 upwardly to engage the work, which end and base 10 are held against any tendency to spread apart. As pressure is applied to screw 40, after the showing of Figure 3, block 30 is forced out until it engages the cam surface 41 of cam block 36. This elevates the left hand end, as viewed, of block 30 to the maximum and extends it out beyond base 10 so that it can very adequately engage the work to be held. As screw 40 is further advanced, block 36 is caused to rock on its curved surface 38, after the showing of Figure 4, and this brings surface 41 upwardly, raising the right hand end of block 30 and depressing the left hand end. This position is illustrated in Figure 4, which is the holding position in which the work has been pressed down against the work table surface and is now held for the machining operation.

In Figure 5 is illustrated the coacting block, the first type, which is essential for the workability of my dual movement block. This block is provided with a large base portion 50, which is in turn provided with securing bolt openings as 52, so that very tight holding-down bolts may be employed in coaction with the grooves of the machine table. The underside of block 50 is provided with guideways as 54 and 55, which in turn are provided with threaded openings as 56 so that guide blocks as 58 may be employed and held in with suitable screws 59, so that block 50 can be readily adapted for use on a wide range of machine tool work tables. It will be observed in Figure 5, it is believed, that blocks 58 are secured partially within guideways 54 and 55, and then extend outwardly an adequate amount to engage the grooves of the machine table. In some instances it may be desirable that the portion of block 50, which extends outwardly, will be machined on a substantial radius so that the blocks may suitably engage arcuate or circular grooves in a machine table.

Adapted to be secured to base 50, as by screw 60, is a clamp plate 62. This plate has an opening as 64 for the passage of the threaded portion of screw 60, and a second counterbore opening 65 for the head portion of screw 60. It is to be noted that there is considerable clearance in both openings 64 and 65, as will be noted in Figures 7 and 8, so that plate 62 will have limited movement in all directions but be generally positioned by screw 60.

Plate 62 is interiorly provided with a groove which is best illustrated in Figures 7 and 8, in that it has an upper surface as 68 which is flat and parallel to the upper outer surface of plate 62. The lower surface of this groove is provided with a stepped portion so that a cam surface is provided at 70 to control the movement of plate 62. This groove, generally designated as 72, provides for the movement of the cam slide member 74 and is of sufficient vertical extent to house member 74 when it is in the position shown in Figure 8. Plate 62 is normally urged upwardly to the position shown in Figure 7 by the bowed spring 75.

In considering plate 62, it is to be noted that it is disposed only for vertical movement, and this is insured by the enclosing side walls 77 and 78 formed as part of block 50, and then by the control imposed upon plate 62 by the cam bar 74. The cam bar 74 has cam member 80 of a thickness to fill the slot 72 in block 62 and provides downward clamping movement of plate 62. This permits the rectangular cross-section of block 74 to ride in groove 83 cut in the end of block 50, and the open cuts 85 and 86 cut in the end walls 77 and 78 of block 50. By this means block 62 and bar 72 are held in their operational position by screw 60 and then, as bar 74 is adjusted by means of the threaded portion 90 and nut 92 with associated washer 93, the cam plate 62 is under full control and, once moved in an adjusted position by cam 80 operating on cam surface 70, will force work downwardly against a work table surface and then hold it there during the machining operation. It is desired to bring out that it is very necessary that plate 62 be held against all movement but vertical, to the end that a plurality of blocks 50 may be secured in position as in a guiding arrangement wherein they are all guided by one of the grooves of a work table, and then the various faces 95, which are grilled as is the case of block 30 previously described, and these various faces will determine a line or, more properly, a plane against which the work is initially placed before the dual movement blocks illustrated in Figures 1, 2, 3 and 4 are brought into coaction with them in securing a piece of work on a machine table.

It is believed that it will be clearly apparent from the above description and the disclosure in the drawings that the invention comprehends a novel construction of hold-down clamp.

Having thus disclosed the invention, I claim:

Means for assisting in securing machine work against a machine table, comprising: a two-way clamp having a base adapted to be bolted to a machine table, a clamp block, having a rear, vertically curved surface disposed substantially parallel to said base and secured to the base by two parallel-positioned links one on each side of said block, resilient means urging the outer end of said clamp block upwardly, a movable cam block secured to said base by two rearwardly inclined parallel positioning links and having a clamp screw, threaded therein, disposed to engage the curved inboard end of said clamp block, a curved lower rear surface normally supporting said cam block, an extension of said cam block having an upper cam surface extending under the inboard end of said clamp block and disposed to lower the workpiece-engaging outer end surface of said clamp block when said clamp screw is tightened.

References Cited in the file of this patent

UNITED STATES PATENTS

| | | |
|---|---|---|
| 824,394 | Warner | June 26, 1906 |
| 999,979 | Fisher | Aug. 8, 1911 |
| 2,637,249 | Swenson | May 5, 1953 |